(12) United States Patent
Xia et al.

(10) Patent No.: US 6,479,648 B1
(45) Date of Patent: Nov. 12, 2002

(54) POLYMERIC BIS-ACETOACETANILIDE AZO COLORANTS

(75) Inventors: Jusong Xia, Moore, SC (US); Eric B. Stephens, Roebuck, SC (US); Mary G. Mason, Spartanburg, SC (US); John W. Miley, Campobello, SC (US); Leonard J. Starks, Duncan, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/994,086

(22) Filed: Nov. 21, 2001

Related U.S. Application Data

(60) Provisional application No. 60/253,773, filed on Nov. 29, 2000.

(51) Int. Cl.[7] .................... C09B 33/153; C08K 5/23; C09D 191/06
(52) U.S. Cl. .................. 534/729; 534/745; 524/190
(58) Field of Search .................. 534/729, 745; 524/190

(56) References Cited

U.S. PATENT DOCUMENTS

| | | | | |
|---|---|---|---|---|
| 4,946,509 A | * | 8/1990 | Schwartz et al. | ........... 106/496 |
| 5,062,894 A | * | 11/1991 | Schwartz et al. | ............. 106/23 |
| 6,106,597 A | * | 8/2000 | Starks et al. | ............. 106/31.08 |

* cited by examiner

*Primary Examiner*—Fiona T. Powers
(74) *Attorney, Agent, or Firm*—Terry T. Moyer; William S. Parks

(57) ABSTRACT

This invention relates to colorants comprising a chromophore having two azo acetoacetanilide moieties, wherein said moieties each have at least one poly(oxyalkylene) chain, preferably at least two such chains. Such colorants exhibit extremely good base stability and lightfastness, particularly when incorporated within certain media and/or on the surface of certain substrates. These poly(oxyalkylene) chains provide solubility in different solvents or resins thereby permitting the introduction of such excellent coloring chromophores within diverse media and/or or diverse substrates. Compositions and articles comprising such colorants are provided as are methods for producing such inventive colorants.

12 Claims, No Drawings

POLYMERIC BIS-ACETOACETANILIDE AZO COLORANTS

CROSS REFERENCE TO RELATED APPLICATIONS

This application is based upon provisional application No. 60/253,773 filed on Nov. 29, 2000.

FIELD OF THE INVENTION

This invention relates to colorants comprising a chromophore having two azo acetoacetanilide moieties, wherein said moieties each have at least one poly(oxyalkylene) chain, preferably at least two such chains. Such colorants exhibit excellent good base stability and lightfastness, particularly when incorporated within certain media and/or on the surface of certain substrates. These poly(oxyalkylene) chains provide solubility in different solvents or resins thereby permitting the introduction of such excellent coloring chromophores within diverse media and/or or diverse substrates. Compositions and articles comprising such colorants are provided as are methods for producing such inventive colorants.

DISCUSSION OF THE PRIOR ART

All U.S. patents cited within this specification are hereby incorporated by reference.

Bis-acetoacetanilide azo pigments, dyes, and dyestuffs generally provide effective and desirable colorations to certain substrates, such as textiles, paper, and the like. However, their use is limited to such a narrow range of substrates and/or media due to the difficulty of solubility, comparability, and migratory problems inherent with such pigments, dyes, or dyestuffs. Such pigments, dyes, and/or dyestuffs have not been widely introduced as colorants within plastics (such as polyolefins, polyurethanes, and the like) due to such physical limitations. However, the utilization of such colorants is highly desired for a number of reasons, foremost the actual colorations available from such specific compounds.

The standard types of polymeric colorants now utilized within plastics (be they thermoplastics or thermoset types) are primarily poly(oxyalkylenated) compounds, such as triphenylmethanes, methines, and the like (i.e., those found within U.S. Pat. No. 4,992,204, to Kluger et al.). Some of these colorants exhibit certain problems in association with the catalysts utilized to effectuate plastic formation. For example, the triphenylmethane and methine moieties of such colorants are susceptible to attack by nucleophilic catalysts and their residues. As a result, the colorations provided by such polymeric colorants may be reduced in strength or changed in shade under such circumstances.

There is thus a desire to introduce such polymeric colorants having bis-acetoacetanilide groups therein within different types of compositions and therefore a desire to provide a bis-acetoacetanilide-type colorant containing polyoxyalkylene chains that can be tailored for versatility. Furthermore, there is a need to provide a colorant for introduction within thermoplastic and thermoset compositions which is far less susceptible to degradation due to attack by basic catalyst residues than the standard poly(oxyalkylenated) colorants of use today. To date, there have been no teachings or fair suggestions of such a highly desirable, specific polymeric bisacetoacetanilide colorant within the pertinent prior art or within the colorant industry itself.

DESCRIPTION OF THE INVENTION

It is thus an object of the invention to provide base stable yellow polymeric colorants for utilization within thermoplastic and thermoset articles. Another object of this invention to provide a yellow polymeric colorant exhibiting amide groups rather than base-susceptible methine moieties, which are thus less susceptible to attack by basic thermoplastic and thermoset catalysts, are easy to process, mixes well within target plastics, and provides excellent colorations within the target finished articles. Yet another object of this invention is to provide excellent colorations within liquid compositions (such as inks, and the like) through the utilization of water-soluble, liquid polymeric colorants, as noted above.

It is to be understood that the term alkyl as used throughout is intended to encompass any straight or branched alkyl moiety, having anywhere from 1 to 30 carbons therein; the same chain length applies to the term "alkoxy" as well. Also, the terms substituted phenyl and substituted polyphenyl are intended to encompass any phenyl system having any type of pendant group attached thereto, including, without limitation, alkyl groups, alkylene groups, alcohol groups, ether groups, ester groups, amine groups, amide groups, hydroxyls, and the like. Phenyl is basically an unsubstituted ring system (and thus includes hydrogens only).

The present invention preferably encompasses poly(oxyalkylenated) acetoacetanilide azo colorants, particularly of the structure of Formula (I)

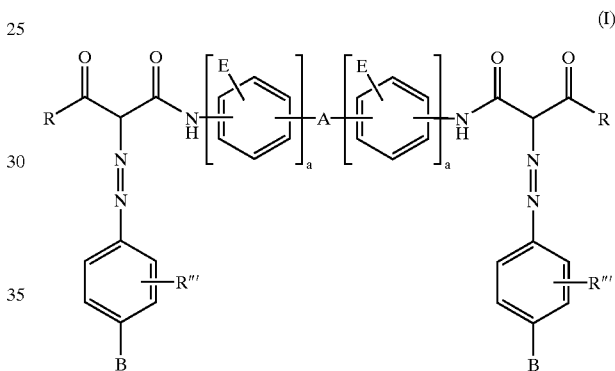

(I)

wherein R is alkyl, phenyl, polyphenyl, substituted phenyl, or substituted polyphenyl; E is hydrogen alkyl, halogen, alkoxy, or phenyl; a is 0, 1, or 2, wherein if a is 0 then A is phenyl, polyphenyl, substituted polyphenyl, or substituted phenyl, if a is 1, then A is O, $SO_2N$, methylene, S, N(R') or a moiety of Structure (II)

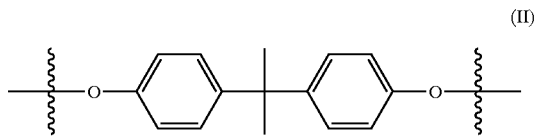

(II)

wherein R' is alkyl or hydrogen, and if a is 2, then A is O, $SO_2$, methylene, S, N(R'), wherein R' is alkyl of hydrogen; B is $R''(gly)_w[(EO)_x(PO)_y(EO)_2EG]_{n''}$ wherein EG is H or a moiety of Structure (III)

(III)

wherein $R_4$ is $C_1$–$C_{12}$ alkyl or phenyl; all wherein gly is glycidol, EO is ethylene oxide, and PO is selected from the group consisting of propylene oxide, butylene oxide, and any mixtures or combinations thereof, n is 1 to 4, and wherein R" is O, N, SO$_2$N, methylene, S, N(R$_5$), wherein R$_5$ is alkyl; wherein if R" is O or SO$_2$N then w=0 or 1, x=0–30, y=0–30, and z=0–30, wherein w+x+y+z>2, and if R" is other than O or SO$_2$N, then w=0–2, x=0–30, y=0–30, and z=0–30, wherein w+x+y+z>2; and wherein R'" is halogen, hydrogen, alkyl, alkoxy, or B.

The present invention also preferably encompasses poly (oxyalkylenated) acetoacetanilide azo colorants of the structure of Formula (IV)

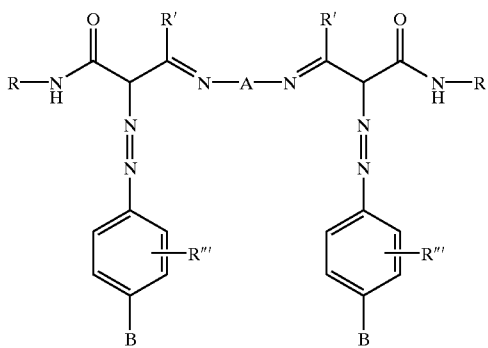

(IV)

wherein R is phenyl, polyphenyl, substituted polyphenyl, or substituted phenyl; R' is alkyl, phenyl, substituted phenyl, or polyphenyl; A is C$_1$ to C$_{20}$ alkyl, alkox ether, (EO)$_k$(PO)$_l$(EO)$_m$, or (PO)$_p$(EO)$_q$(PO)$_r$, wherein k=0–30, l=0–30, m=0–30, wherein k+l+m>1, and wherein p=0–30, q=0–30, and r=0–30, wherein p+q+r>1; wherein B is R"(gly)$_w$[(EO)$_x$(PO)$_y$(EO)$_z$EG]$_{n}$, wherein EG is H or a moiety of Structure (III)

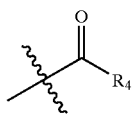

(III)

wherein R$_4$ is C$_1$–C$_{40}$ alkyl or phenyl; all wherein gly is glycidol, EO is ethylene oxide, and PO is selected from the group consisting of propylene oxide, butylene oxide, and any mixtures or combinations thereof, n is 1 to 4, and wherein R" is O, N, SO$_2$N, methylene, S, N(R$_5$), wherein R$_5$ is alkyl or H; wherein if R" is O, S, or SO$_2$N then w=0 or 1, x=0–30, y=0–30, and z=0–30, wherein w+x+y+z>2, and if R" is other than O, S, or SO$_2$N, then w=0–2, x=0–30, y=0–30, and z=0–30, wherein w+x+y+z>2; and wherein R'" is halogen, hydrogen, alkyl, alkoxy, or B.

Basically, such a colorant comprises a chromophore having two azo acetoacetanilide moieties and at least two poly(oxyalkylene) chains. Such a compound is prepared by diazotizing an aromatic amine compound, which comprises such poly(oxyalkylene) chains, in reaction with a compound conforming with the formula of Structure (V)

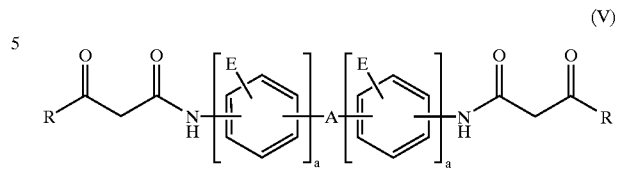

(V)

wherein R is alkyl, phenyl, polyphenyl, or substituted phenyl; E is H, halogen, alkyl, alkoxy, or phenyl; a is 0, 1, or 2, wherein if a is 0 then A is phenyl, polyphenyl, substituted polyphenyl, or substituted phenyl, if a is 1, then A is O, SO$_2$N, methylene, S, N(R') or a moiety of Structure (II)

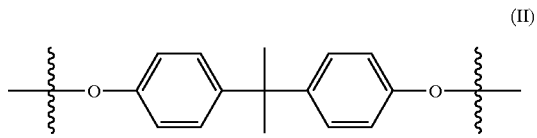

(II)

wherein R' is alkyl or hydrogen, and if a is 2, then A is O, SO$_2$, methylene, S, N(R'), wherein R' is alkyl of hydrogen.

Preferably, the poly(oxyalkylene) chains of the inventive colorant comprise nucleophilic terminal groups capable of reacting with at least a portion of certain monomers which couple with bisacetoanilide or any such derivatives to form the desired polymeric colorant. Such polymeric colorants, which are normally present as liquids, are usually brightly colored greenish yellow, and are brighter than, show improved base stability, and are extremely lightfast, particularly in comparison with many traditional polymeric colorants. Furthermore, this invention encompasses any article or composition comprising such an inventive colorant or colorants, including, without limitation, waxes, thermoplastics (such as, without limitation, polyolefins, including, again, without limitation, polypropylene, and polyesters, such as polyethylene terephthalate, all without limitation), and thermosets (such as, without limitation, polyurethanes, including, again, without limitation, polyurethane foams).

Preferably, the particular oxyalkylene groups are selected from ethyleneoxy (EO), propyleneoxy (PO), and butyleneoxy (BO) groups. Preferably, are mixtures of EO and PO groups, although the presence of all EO or PO or BO groups may be utilized as well. Preferably, from about 2 to about 300 moles of alkyleneoxy groups are present on each separate polyoxyalkylene pendant group; more preferably from about 2 to 100 moles; and most preferably from about 2 to 15 moles. The term "polyoxyalkylene" is intended to encompass any pendant group which includes at least two alkyleneoxy moieties.

The addition of polyoxyalkylene groups to the bisacetoacetanilide base compound may be accomplished through the reaction of the aforementioned poly(oxyalkylenated) aromatic amine with a number of different compounds possessing the required bis-acetoacetanilide azo groups. The aromatic amine may be of any structure, depending on the desired characteristics available through the presence of different pendant groups on the aromatic amine itself. The potential preferred aromatic amines useful in this respect are those represented by the following Structure (VI)

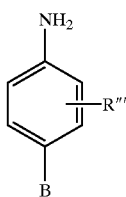

(VI)

wherein R''' is H, alkyl, alkoxy, or B; wherein B is R''(gly)$_w$-[(EO)$_z$(PO)$_y$(EO)$_x$H]$_{n''}$; wherein gly is glycidol, EO is ethylene oxide, and PO is selected from the group consisting of propylene oxide, butylene oxide, and any mixtures or combinations thereof, n 1 to 4, and wherein R'' is O, N, SO$_2$, methylene, S, N(R$_5$), wherein R$_5$ is alkyl or R$_6$—O—R$_7$, wherein R$_6$ and R$_7$ are the same or different and are each individually C$_1$–C$_4$ alkyl; wherein if R'' is O or SO$_2$ then w=0 or 1, x=0–30, y=0–30, and z=0–30, wherein w+x+y+z>2, an SO$_2$, then w=0–2, x=0–30, y=0–30, and z=0–30, wherein w+x+y+z>2.

The potential bis-acetoacetanilide azo compounds are thus represented by the above-described described Structures (I) and (IV).

The presence of surfactants, solvents, and the like, may be utilized to alter the solubility, coloring characteristics, and the like, of the ultimate poly(oxyalkylenated) bis-acetoacetanilide azo compounds which would be understood and appreciated by the ordinarily skilled artisan within this particular art.

Preferably, the colorant compound (I) is liquid in nature at ambient temperature and pressure and at substantial purity; however, pasty or waxy colorants are also encompassed within this invention. In order to effectuate coloring of substrates and media, any other standard colorant additives, such as resins, preservatives, surfactants, solvents, antistatic compounds, and the like, may also be utilized within the inventive colorant compound compositions or methods.

DESCRIPTION OF THE PREFERRED EMBODIMENT

The specific formulations below, as well as the following exemplified methods of producing such and methods of coloring using such are thus indicative of the preferred embodiments of this invention:

Precursor Formation

EXAMPLE 1

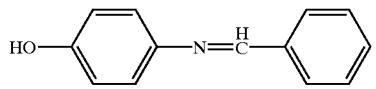

Ethanol (200 proof, 515 g) and p-aminophenol (300 g, 2.75 mol) were charged into a 2 L 3-neck round bottom flask equipped with a thermometer and a condenser. Benzaldehyde (292 g, 2.75 mol) was added from an additional funnel while maintaining a slow and steady flow and stirring. Another portion of ethanol (150 g) was added and the whole mixture was heated to reflux for 1.5 h. After cooling down to room temperature, the solid thus formed was collected by filtration and washed three times with ethanol (3×50 ml) and dried. 492 g (91%) of the imine product (structure above) was obtained as a pale yellow powder.

EXAMPLE 2

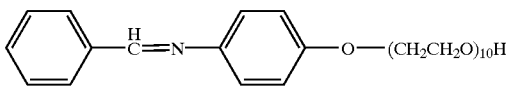

The imine product (285 g, 1.44 mol) from Example 1, toluene (200 m l) and KOH (6 g) were charged into a one-gallon stainless steel reactor. After being purged 3 times to 60 psi with nitrogen, the reaction mixture was heated to 250° F. and ethylene oxide (635 g, 14.4 mol) was added over a period of 2 hours. The mixture was then cooled down to room temperature and the toluene was stripped to yield 910 g (98.2%) of pale brown yellow liquid polyethylene glycol (10) imine (structure above).

EXAMPLE 3

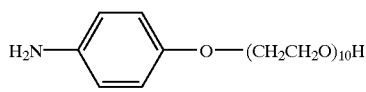

The imine (340 g, 0.27 mol) from Example 2 and water (150 g) were charged into a 1000-ml 3-neck flask. Concentrated hydrochloric acid (56 g) was added carefully while stirring and maintaining the temperature below 45° C. After stirred for 30 min at 50° C., the mixture was transferred into a 1000-ml flask and stripped by a rotary evaporator at 85–95° C. for 1.5 hour. After cooling down to room temperature, 240 g of water was charged into the reaction mixture and the whole was stripped at 85–95° C. for 1.5 hour. Then another 240 g of water was added and the mixture was stripped at 85–95° C. till all of the water and benzaldehyde were removed. 285 g (97%) of product polyethylene glycol (10) aniline (structure above) was obtained as a light brownish yellow liquid.

EXAMPLE 4

4-Nitrophenol (218 g, 1.57 mol), toluene (500 g) and KOH (4 g) were charged into a one gallon stainless steel reactor. After being purged 3 times to 60 psi with nitrogen, the reaction mixture was heated to 250° F. and ethylene oxide (138 g, 3.14 mol) was added over a period of 30 min. The mixture was post-heated to 120° F. for 1 hour, and then followed by the addition of propylene oxide (567 g, 9.77 mol) in a period of 1 hour. After being post-heated for 1 hour at 120° F., ethylene oxide (265 g, 6.02 mol) was charged into the reactor in 1 hour and the mixture was heated for another 2 hours at 120° F. Upon vacuum stripped for 1.5 hours at 235° F. and cooling down to room temperature, 1132 g (95%) of product nitrophenol (structure above) was obtained as a pale yellow liquid.

EXAMPLE 5

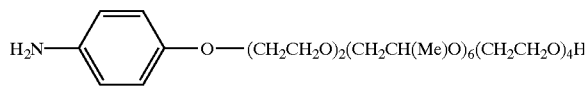

The nitrophenol (120 g, 0.16 mol, from Example 4) and ethanol (100 ml) were charged into a 500-ml hydrogenation flask. Then Pd/C (5%, 3 g) was carefully added and the whole was hydrogenated at 42 psi for 1 hour. After removal of catalyst and ethanol, 106 g (92%) of product aminophenol (structure above) was obtained as a pale yellow liquid.

EXAMPLE 6

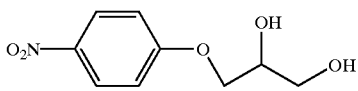

4-Nitrophenol (300 g, 2.16 mol), toluene (240 ml) and KOH flake (0.6 g) were charged into a 1000-ml 3-neck flask and the mixture was heated to 90° C. for 30 min. After cooling down to 50° C., glycidol (192 g, 2.59 mol) was introduced through an additional funnel while stirring and the resulting mixture was heated to 90° C. for 24 hours. GC-MS found that the 4-nitrophenol was consumed. The reaction was cooling down, toluene and excess of glycidol were removed by a rotary evaporator. 440 g (95.7%) of product nitrophenoxyglycidol (structure above) was obtained.

EXAMPLE 7

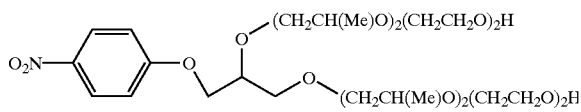

The Example 4 nitrophenoxyglycidol (250 g, 1.17 mol), toluene (500 g) and KOH (4 g) were charged into a one-gallon stainless steel reactor. After being purged 3 times to 60 psi with nitrogen, the reaction mixture was heated to 250° F. and propylene oxide (274 g, 4.72 mol) was added over a period of 1 hour. The mixture was heated to 120° F. for 1 hour, and then followed by the addition of ethylene oxide (207 g, 4.72 mol) in a period of 1 hour. After being heated for 2 hours at 120° F., the mixture was stripped for 1.5 hours at 235° F. Upon cooling down to room temperature, 712 g (97%) of product nitrophenoxyglycidol (structure above) was obtained as a pale yellow liquid.

EXAMPLE 8

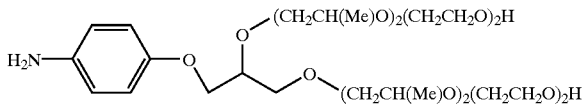

Following the procedure as described in Example 5, 105 g (92%) of 4-amino-phenoxyglycidol (structure above) was prepared from the reduction of 120 g (0.19 mol) of of the nitrophenoxyglycidol from Example 7 in methanol (100 ml) in the presence of Pd/C (5%, 5 g), as a pale yellow liquid.

Intermediate Compound Formation

EXAMPLE 9

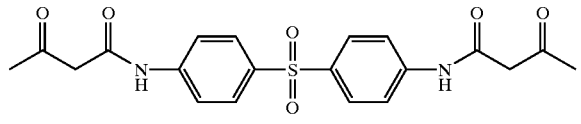

A mixture of 4,4'-diaminodiphenyl sulfone (12.4 g, 50 mmol), ethyl acetoacetate (14.5 g, 111 mmol), 2-hydroxypyridine (0.4 g) and para-Xylene (20 ml) was stirred under refluxing for 4 hours. Upon being cooled and stayed at room temperature overnight, the precipitate was collected by filtration and washed twice with cold ethanol and dried. 19.5 g (93.5%) of product bis(acetoacetanilide)-p-sulfone (structure above) was obtained as a yellow solid (mp 252–260° C.), which was used as a starting material without further purification.

EXAMPLE 10

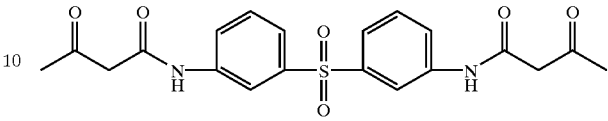

A mixture consisting of 3,3'-diaminodiphenyl sulfone (12.4 g, 50 mmol), ethyl acetoacetate (20 g, 150 mmol), copper powder (0.3 g) and para-Xylene (20 ml) was stirred under refluxing for 4 hours. Upon being cooled and stayed at room temperature overnight, 19 g (91.3%) of product bis(acetoacetanilide)-m-sulfone (structure above) was obtained as a light yellow semi-solid which was used as a starting material without further purification. Infrared analysis of the product showed no ester peak (1730 cm-1) contained in the product.

EXAMPLE 11

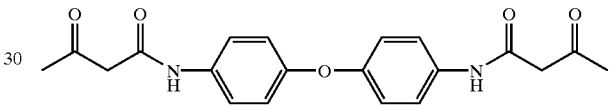

To a 250-ml 3-neck equipped with thermometer and distillation condenser, were charged p-xylene and a mixture of triethanolamine (0.75 g, 5 mmol) in ethanol (1.5 ml). The reaction was heated to boiling until 13 ml of ethanol/p-xylene mixture was distilled off. After being cooled to room temperature, 4,4'-oxydianiline (10 g, 50 mmol) was added to the reaction, and the resulting mixture was heated to reflux. At this temperature, a solution of methyl acetoacetate (18 g, 155 mmol) in p-xylene (20 ml) was introduced dropwise to the reaction in 1 hour while the mixture of methanol/p-xylene was distilled off. After completion of the addition, another portion of p-xylene (50 ml) was added. In the end, 100 ml of distillate was collected. Upon being cooled to room temperature, the precipitate was collected by filtration and boiled with ethanol (50 ml). After being cooled to room temperature, the precipitate thus formed collected and dried in a 50° C. oven overnight, yielding 18 g (97.8%) of product 4,4'-oxy-bis(acetoacetanilide) (structure above) as a light yellow solid (mp 178–182° C.).

EXAMPLE 12

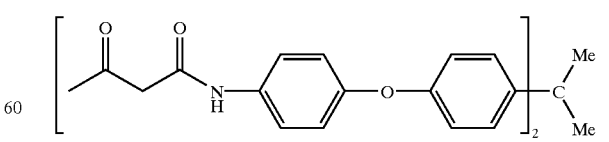

Following the procedure described in Example 11, 2,2'-bis[4-(4-aminophenoxy)phenyl]-propane (BAPP, 20.5 g, 50 mmol) was reacted with methyl acetoacetate (18 g, 155 mmol) in p-xylene in the presence of triethanolamine (0.75 g, 5 mmol), to give 25 g (86.5%) of product Bis (acetoacetanilide)-BAPP (structure above) as a light yellow semi-solid. This crude product was used as a starting material without further purification.

Polymeric Colorant Formation

EXAMPLE 13

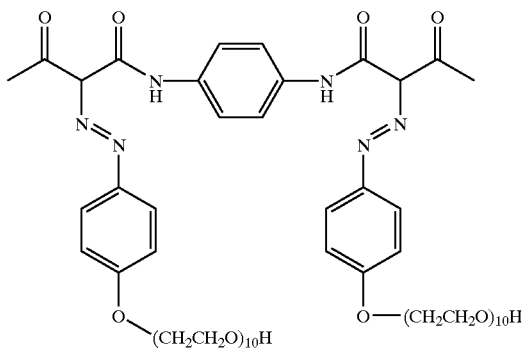

To a 100-ml 3-neck flask were charged water (20 ml), muriatic acid (3.8 g), 2-ethylhexanol (0.3 g) and polyethylene glycol aniline (19.2 g, 35 mmol) from Example 3. The mixture was cooled down to 0° C. by an ice bath. A solution of NaNO2 (4.4 g) in 10 ml of water was slowly added while stirring and maintaining the temperature below 5° C. After completion of the addition, the reaction mixture was stirred at 0–5° C. for 40 min. To this solution, sulfamic acid (2.5 g) was carefully added and the resulting mixture was stirred at 0–5° C. for 30 min.

To another 250-ml flask were charged caustic (3 g), a 40% aqueous solution of EDTA, tetrasodium salt (6 g), water (35 ml) and diacetoacet-1,4-phenylenediamide (4.83 g, 17.5 mmol), the mixture was stirred and cooled down to 5–10° C. The above diazo solution was slowly introduced into this diacetoacet-1,4-diamide solution while stirring and maintaining the temperature at lower than 15° C. The resulting mixture was post-stirred for 1 hour at 10–15° C. After adjusting pH to 7.5–8.5, the mixture was heated to 70° C. and poured into a separation funnel. Organic layer was collected and washed twice with water (2×50 ml). Upon being stripped for 1.5 hour at 95° C. to remove water, 16 g of product was obtained as a yellow viscous liquid with a color-strength of 43.8 abs./g/L (MeOH) and the maximum absorbency at 398 nm.

EXAMPLE 14

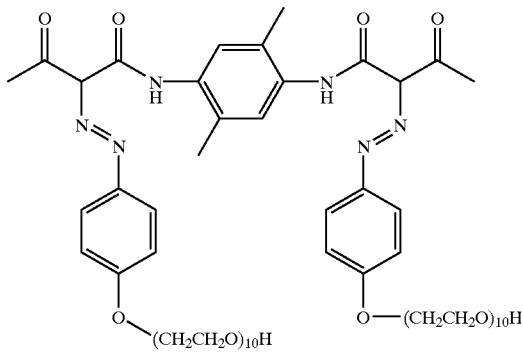

Following the procedure described in Example 13, polyethylene glycol aniline (19.2 g, 35 mmol) from Example 3 was diazotised and coupled with diacetoacet-2,5-dimethyl-1,4-phenylenediamide (5.25 g, 17.5 mmol). Upon being washed and stripped, 17 g of product was obtained as a very viscous yellow liquid (structure above) (semi-solid) with the maximum absorbency at 400.5 nm (MeOH).

EXAMPLE 15

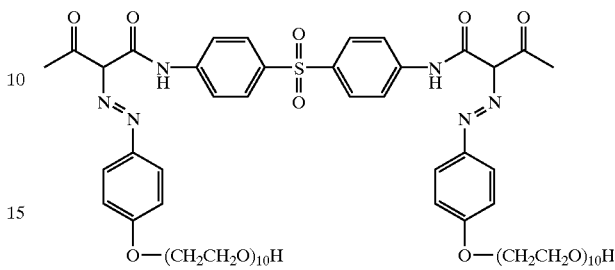

Following the procedure described in Example 13, polyethylene glycol aniline (35 mmol) from Example 3 was diazotised and coupled with bis(acetoacetanilide)-p-sulfone (7.3 g, 17.5 mmol) from Example 9. Upon being washed and stripped, 15 g of product was obtained as a very viscous yellow liquid (structure above) (semi-solid) with the maximum absorbency at 394 nm (MeOH).

EXAMPLE 16

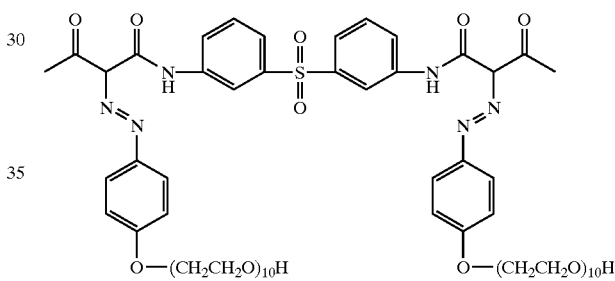

Following the procedure described in Example 13, polyethylene glycol aniline (19.2 g, 35 mmol) from Example 3 was diazotised and coupled with bis(acetoacetanilide)-m-sulfone (7.3 g, 17.5 mmol) from Example 9. Upon being washed and stripped, 17 g of product was obtained as a very viscous yellow liquid (structure above) with a color-strength of 31 abs./g/L and the maximum absorbency at 388.5 nm (MeOH).

EXAMPLE 17

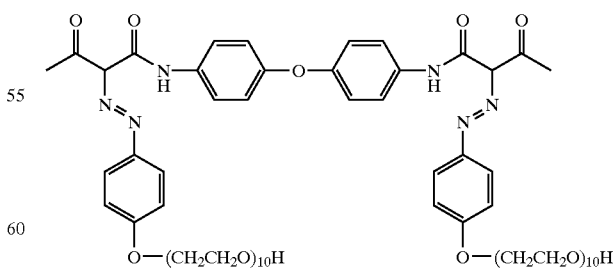

Following the procedure described in Example 13, polyethylene glycol aniline (19.2 g, 35 mmol) from Example 3 was diazotised and coupled with 4,4'-oxy-bis (acetoacetanilide) (6.5 g, 17.5 mol) from Example 11. Upon being washed and stripped, 15 g of product was obtained as a viscous yellow liquid (structure above) with a color-strength of 28.7 abs./g/L and the maximum absorbency at 392 nm (MeOH).

EXAMPLE 18

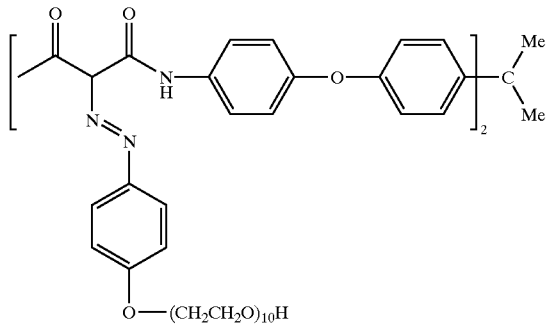

Following the procedure described in Example 13, polyethylene glycol aniline (19.2 g, 35 mmol) from Example 3 was diazotised and coupled with bis(acetoacetanilide)-BAPP (10.1 g, 17.5 mol) from Example 12. Upon being washed and stripped, 20 g of product was obtained as a very viscous yellow liquid (structure above) (semi-solid) with a color strength of 24.8 abs./g/L and the maximum absorbency at 392 nm (Acetone).

EXAMPLE 19

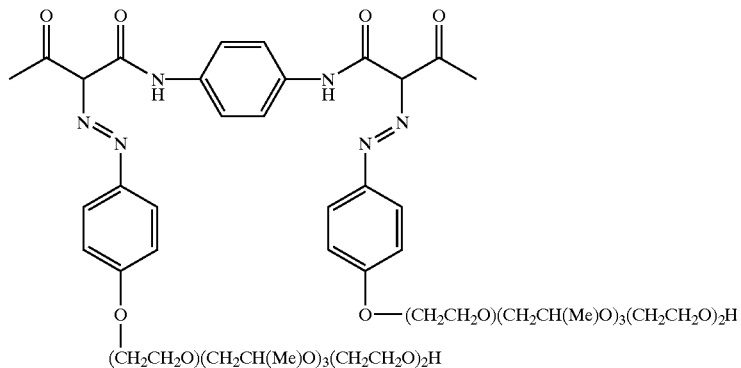

Following the procedure described in Example 13, 4-aminophenol (24.6 g, 35 mmol) from Example 5 was diazotised and coupled with diacetoacet-1,4-phenylenediamide (4.83 g, 17.5 mmol). Upon being washed and stripped, 21 g of product was obtained as a very viscous yellow liquid (structure above) (semi-solid) with a color-strength of 29.3 abs./g/L and the maximum absorbency at 400 nm (MeOH).

EXAMPLE 20

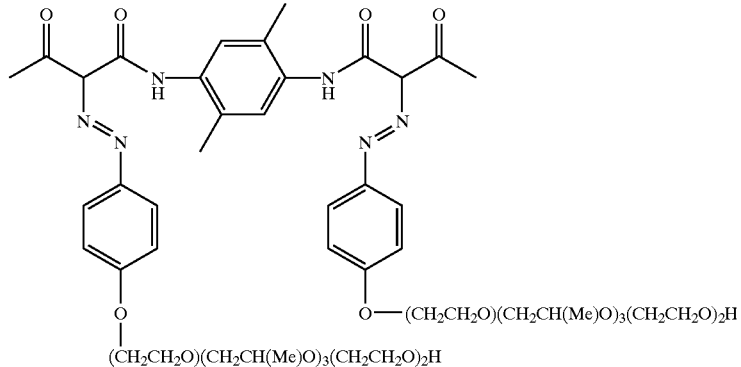

4-aminophenol (50 g, 0.069 mol) from Example 5, water (40 g), 2-ethylhexanol (0.6 g) and muriatic acid (17 g) were combined in a reaction vessel and cooled to 0° C. At 0° C., a solution of sodium nitrite (4.80 g, 0.070 mol) in water (20 g) was added at a rate such that the temperature did not exceed 5° C. After the addition, the reaction proceeded at 0–5° C. for one hour. Sulfamic acid was used to destroy excess nitrous acid (determined by starch-iodine paper). The diazonium salt solution was added to the coupling solution cooled to 5° C. The coupling solution consisted of diacetoacet-2,5-dimethyl-1,4-phenylene diamine (10.49 g, 0.035 mol), caustic (13 g), versene (13 g) and water (180 ml). After stirring for two hours at room temperature, the pH was adjusted to 7.5 using 93% sulfuric acid. The product was extracted into chloroform (600 ml) and the organic layer washed twice, each time with water (300 ml). The organic layer was stripped via rotary evaporation yielding 3 g of product as a very viscous yellow liquid (structure above) (semi-solid) with a color-strength of 20.1 abs./g/L and the maximum absorbency at 394 nm (acetone).

EXAMPLE 21

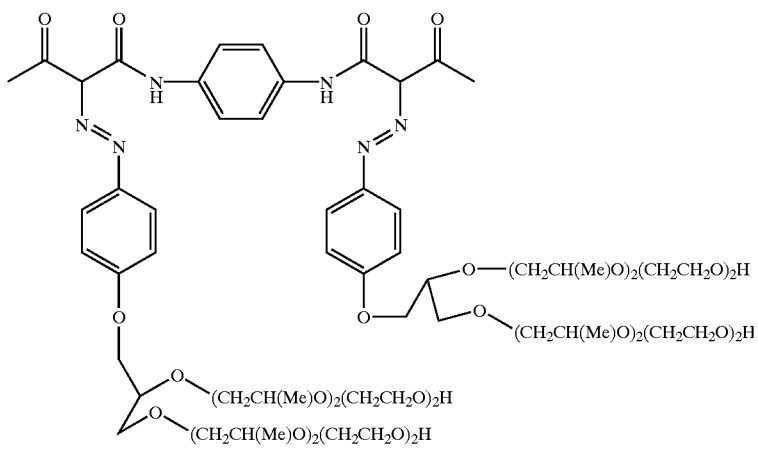

Following the procedure described in Example 13, 4-aminophenoxyglycidol (20.6 g, 35 mmol) from Example 8 was diazotised and coupled with diacetoacet-1,4-phenylene diamide (4.83 g, 17.5 mmol). Upon being washed and stripped, 19 g of product was obtained as a viscous yellow liquid (structure above) with a color-strength of 24 abs./g/L and the maximum absorbency at 398.5 nm (MeOH).

EXAMPLE 22

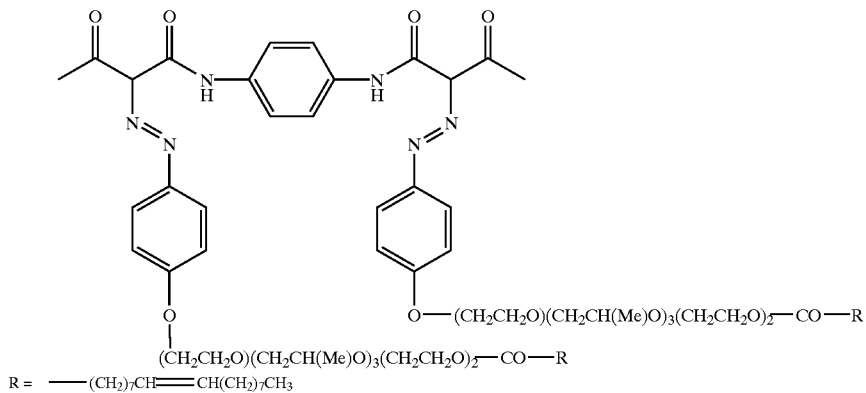

28.40 g of the product from Example 19 was charged to a reactor with 6.21 g of triethylamine and 20 mL of tetrahydrofuran (THF). To this mixture was slowly added 19.12 g of oleoyl chloride at room temperature. The resulting mixture was then heated to 40° C. and monitored by infrared (IR) spectroscopy to determine the point in time during the reaction at which the acid chloride peak (~1800 nm) disappeared. The mixture was then placed in a separatory funnel in which it was washed with aqueous sodium carbonate and water. The organic phase of the separated mixture was then filtered and stripped under vacuum to yield 31.25 g of a yellow paste-like polymeric colorant (structure above).

EXAMPLE 23

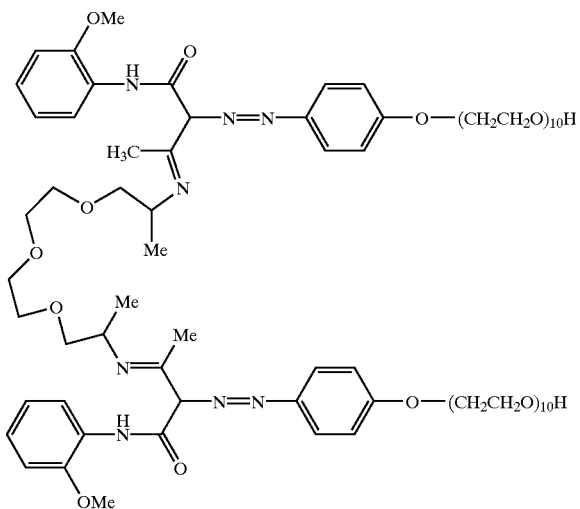

The polymeric 2'-acetoacetanilide azo yellow colorant (40 g, 52 mmol) from Example 20 and Jeffamine® XTJ-511 (6.4 g, 28 mmol, sample from Huntsman Corp.) were charged into a 100-ml 3-neck flask. The mixture was stirred and heated to 160–165° C. for 1–2 hours while a stream of nitrogen was passed through the mixture to remove from it the water formed by the reaction. Infrared analysis of the product showed the disappearance of the peak at 1655 cm$^{-1}$, which corresponds to the acetyl group that is present in the starting material yellow colorant. Upon being cooled to room temperature, 38 g of product Jeffamine® XTJ-511 modified polymeric 2'-acetoacetanisidide azo colorant was collected as a viscous yellow liquid (structure above) with a color-strength of 30 abs./g/L (MeOH) and the maximum absorbency at 389.5 nm.

EXAMPLE 24

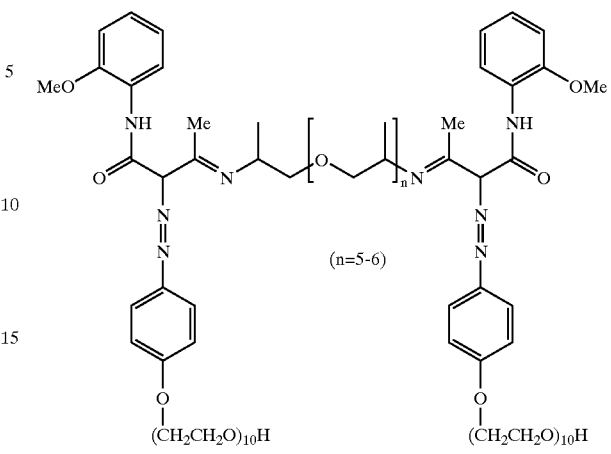

The polymeric 2'-acetoacetoluidide azo yellow colorant (50 g, 67 mmol) from Example 19 and Jeffamine® D-400 (14 g, 34 mmol, sample from Huntsman Corp.) were charged into a 100-ml 3-neck flask. The mixture was stirred and heated to 160–165° C. for 1–2 hours while a stream of nitrogen was passed through the mixture to remove from it the water formed by the reaction. The reaction was monitored by Infrared analysis. Upon being cooled to room temperature, 58 g of product Jeffamine® D-400 modified polymeric 2'-acetoacetoluidide azo colorant was collected as a viscous yellow liquid (structure above) with a color-strength of 28 abs./g/L (MeOH) and the maximum absorbency at 389.5 nm.

Compositions of the Inventive Colorants

1. Wax Formulations 0.20 g of the colorant from EXAMPLE 22 were diluted in 19.80 g of Span® 80. 2 g of this mixture were subsequently introduced within 98 g of molten paraffin wax. After mixing, the liquid wax solution became a homogeneous yellow composition. The liquid wax solution was then poured into a candle mold with a wick inserted in the middle and subsequently allowed to cool. The resultant homogeneous liquid wax solution (prior to cooling) exhibited little or no colorant droplets and the colorant was well dispersed throughout the resultant solid wax candle (after cooling). Furthermore, after removing the solid candle from the plastic beaker, there was no transfer of color from the candle indicating no appreciable migration of the colorant from the solid wax medium.

2. Thermoplastic and Thermoset Formulations

Tests were conducted to determine the extractability and clarity of the inventive bis-acetoacetanilide azo yellow colorants prepared (as described earlier) within certain thermoplastics and thermosets (e.g., polyolefins, such as polypropylene, polyesters, such as polyethylene terephthalate, and polyurethanes, such as polyurethane foams). In all such tested media, the colorants provided excellent, bright yellow colorations therein.

In order to correct for varying color strengths, the colorants were all cut to a consistent color value with a poly ethylene glycol 400 NF. This was accomplished by taking a known amount of colorant with a known color value. The amount of diluent added was determined as follows:

[(Uncut CV/Desired Cut CV)−1] (Wgt. Of uncut color)=weight of PEG 400 added

In this case, the preferred colorant was cut to a color value (CV) of 27.

a. Thermoplastics—Polypropylene

For the thermoplastic extraction test, all colorants were loaded into polyolefin resins at 4000 ppm (4% by weight). The polypropylene random copolymer resin used in the extraction study was Fina® 7525. The general procedure for making plaques for extraction, clarity, and lightfastness testing was as follows. The proper weight of colorant was added to 100 gram of pelletized polyolefin resin. The mixture was then mixed 3 minutes on a laboratory Hobart mixer to insure uniform colorant distribution over the surface of the pellets. The samples were then extruded on a laboratory MPM single screw extruder at 325 F. The resulting colored pellets were then injection molded at 200° C. on an Arburg® 25-ton molder into plaques measuring 2"×3"× 0.05". Background plaques were made by extruding and molding uncolored resin using the same procedure described above.

The procedure for testing extraction on the colored PP plaques prepared above was as follows. Plaques were placed in stainless steel dye kettles. The vessels had Teflon lined tops. The total volume of the container was 200 cc. It required 125 g of extraction solvent to cover the plaques. One plaque was cut in half and placed in each stainless steel pressure vessel. The two pieces of the plaque were separated by a glass slide. 125 Gram of the extraction solvent (10% EtOH) which had been preheated to 70° C. was then poured into the extraction vessel. The vessel was screw closed and placed in a 70° C. oven for two hours after which time the plaques were removed from the extraction solutions. The amount of color that was extracted from the plaques was determined by measuring the absorbance of the extracting solution in a 1.0 cm cell on a Beckman® DU-650 Spectrophotometer. The extraction solution from the uncolored plaques was used as a background. The results are summarized below:

| Sample | % Haze | Extraction Absorbance |
|---|---|---|
| Example 13 | 42.9 | 0.005 |
| Example 19 | 34.8 | 0.006 | b. Thermoplastics—Polyesters

The Yellow polymeric colorants were incorporated into PET resin as follows. In order to correct for varying color strengths, the loading of each color was calculated so that it was equivalent to 0.2% (by weight of the PET) at a color value of 27.0. The color was then mixed onto the surface of dried PET (Shell® 8430) pellets in a Hobart blender. The resulting colored pellets were then injection molded at 200 C. on an Arburg® 25-ton molder into plaques measuring 2"×3"×0.05". Background plaques were made by extruding and molding uncolored resin using the same procedure described above.

The procedure for testing extraction on the colored PET plaques prepared above was as follows. Plaques were placed in stainless steel dye kettles. The vessels had Teflon lined tops. The total volume of the container was 200 cc. It required 125 g of extraction solvent to cover the plaques. One plaque was cut in half and placed in each stainless steel pressure vessel. The two pieces of the plaque were separated by a glass slide. 125 Gram of the extraction solvent (10% EtOH) which had been preheated to 70° C. was then poured into the extraction vessel. The vessel was screw closed and placed in a 70° C. oven for two hours after which time the plaques were removed from the extraction solutions. The amount of color that was extracted from the plaques was determined by measuring the absorbance of the extracting solution in a 10.0 cm cell on a Beckman® DU-650 Spectrophotometer. The extraction solution from the uncolored plaques was used as a background. The results are summarized below:

| Sample | % Haze | Extraction Absorbance |
|---|---|---|
| Example 13 | 1.9 | 0.0002 |
| Example 19 | 2.1 | 0.0003 | c. Thermosets

Polyurethane foams were produced with the following composition and in accordance with the following prcedure:

| Component | Amount (php of the polyol content) |
|---|---|
| F3022 Polyol | 100 parts |
| Water | 4.53 |
| DABCO TL (catalyst) | 0.15 |
| DABCO T10 (catalyst) | 0.30 |
| L520 Silicone (from Witco) | 1.0 |
| 82120 toluene diisocyanate | 43.6 |
| Colorant | 1.0 |

The individual colorants utilized within the example foams were the following: Examples 13, 14, 19, and 20. Upon mixture within a reaction vessel, the reaction created a "health" bubble, and the vessel was then exposed to 185° C. (generated within a microwave oven to simulate actual temperatures encountered on an industrial production level) for about 10 minutes. The resultant foam bun was then sliced in half and analyzed empirically. All of the above inventive colorants provided very bright yellow foam articles.

The foam articles comprising the inventive colorants from Examples 13, 14, 19, and 20 were also analyzed for lightfastness by directly exposing each individual article to a Xenon light for 5, 10 and 20 hour duration intervals. Each article exhibited outstanding lightfastness results as no appreciable discoloration was observed.

There are, of course, many alternative embodiments and modifications of the present invention which are intended to be included within the spirit and scope of this invention.

What we claim is:

1. A colorant comprising a chromophore having two azo acetoacetanilide moieties and at least two pendant poly (oxyalkylene) chains conforming to the structure of Formula (I)

(I)

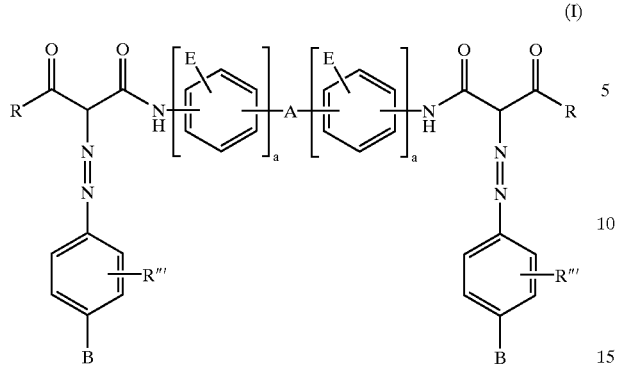

wherein R is alkyl, phenyl, polyphenyl, substituted phenyl, or substituted polyphenyl; E is hydrogen, alkyl, halogen, alkoxy, or phenyl; a is 0, 1, or 2, wherein if a is 0 then A is phenyl, polyphenyl, substituted polyphenyl, or substituted phenyl, if a is 1, then A is O, $SO_2N$, methylene, S, N(R') or a moiety of Structure (II)

(II)

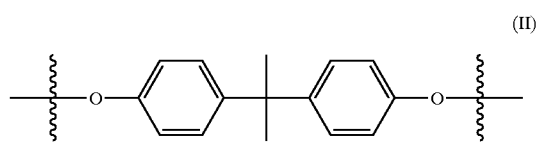

wherein R' is alkyl or hydrogen, and if a is 2, then A is O, $SO_2$, methylene, S, N(R'), wherein R' is alkyl of hydrogen; B is R"(gly) $_w$[(EO)$_x$(PO)$_y$(EO)$_z$EG]$_{n"}$ wherein EG is H or a moiety of Structure (III)

(III)

wherein $R_4$ is $C_1$–$C_{12}$ alkyl or phenyl; all wherein gly is glycidol, EO is ethylene oxide, and PO is selected from the group consisting of propylene oxide, butylene oxide, and any mixtures or combinations thereof, n is 1 to 4, and wherein R" is O, N, $SO_2N$, methylene, S, N($R_5$), wherein $R_5$ is alkyl; wherein if R" is O or $SO_2N$ then w=0 or 1, x=0–30, y=0–30, and z=0–30, wherein w+x+y+z>2, and if R" is other than O or $SO_2N$, then w=0–2, x=0–30, y=0–30, and z=0–30, wherein w+x+y+z>2; and wherein R'" is halogen, hydrogen, alkyl, alkoxy, or B.

2. An article selected from the group consisting of a wax formulation, a thermoplastic, and a thermoset, said article comprising the colorant of claim 1.

3. The article of claim 2 wherein said article is a thermoplastic.

4. The article of claim 3 wherein said thermoplastic comprises polypropylene.

5. The article of claim 2 wherein said article is a thermoset.

6. The article of claim 5 wherein said thermoplastic comprises polyurethane.

7. A colorant comprising a chromophore having two azo acetoacetanilide moieties and at least two pendant poly(oxyalkylene) chains conforming to the structure of Formula (IV)

(IV)

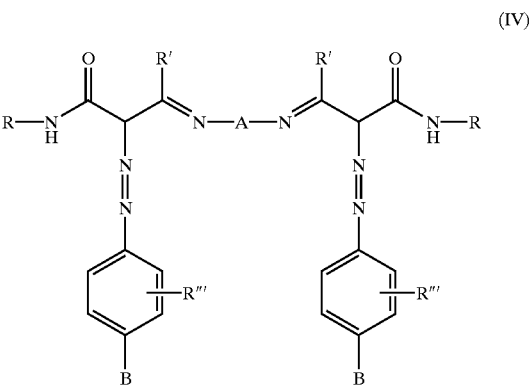

wherein R is phenyl, polyphenyl, substituted polyphenyl, or substituted phenyl; R' is alkyl, phenyl, substituted phenyl, or polyphenyl; A is $C_1$ to $C_{20}$ alkyl, alkox ether, (EO)$_k$(PO)$_l$(EO)$_m$, or (PO)$_p$(EO)$_q$(PO)$_r$, wherein k=0–30, l=0–30, m=0–30, wherein k+l+m>1, and wherein p=0–30, q=0–30, and r=0–30, wherein p+q+r>1; wherein B is R"(gly) $_w$[(EO)$_x$(PO)$_y$(EO)$_z$EG]$_{n"}$ wherein EG is H or a moiety of Structure (III)

(III)

wherein $R_4$ is $C_1$–$C_{40}$ alkyl or phenyl; all wherein gly is glycidol, EO is ethylene oxide, and PO is selected from the group consisting of propylene oxide, butylene oxide, and any mixtures or combinations thereof, n is 1 to 4, and wherein R" is O, N, $SO_2N$, methylene, S, N($R_5$), wherein $R_5$ is alkyl or H; wherein if R" is O, S, or $SO_2N$ then w=0 or 1,x=0–30, y=0–30, and z=0–30, wherein w+x+y+z>2, and if R" is other than O, S, or $SO_2N$, then w=0–2, x=0–30, y=0–30, and z=0–30, wherein w+x+y+z>2; and wherein R'" is halogen, hydrogen, alkyl, alkoxy, or B.

8. An article selected from the group consisting of a wax formulation, a thermoplastic, and a thermoset, said article comprising the colorant of claim 7.

9. The article of claim 8 wherein said article is a thermoplastic.

10. The article of claim 9 wherein said thermoplastic comprises polypropylene.

11. The article of claim 8 wherein said article is a thermoset.

12. The article of claim 11 wherein said thermoplastic comprises polyurethane.

* * * * *